(12) United States Patent
Tsukihashi et al.

(10) Patent No.: US 7,068,571 B2
(45) Date of Patent: Jun. 27, 2006

(54) OPTICAL RECORDING APPARATUS AND CONTROL METHOD THEREOF

(75) Inventors: Akira Tsukihashi, Gunma (JP); Michiyoshi Sawada, Gunma (JP); Kazunori Ueki, Kiryu (JP); Tadashi Iwama, Takasaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 562 days.

(21) Appl. No.: 10/253,458

(22) Filed: Sep. 24, 2002

(65) Prior Publication Data
US 2003/0076756 A1   Apr. 24, 2003

(30) Foreign Application Priority Data
Oct. 18, 2001  (JP)  .............................. 2001-320987
Nov. 13, 2001  (JP)  .............................. 2001-347391

(51) Int. Cl.
*G11B 7/005*  (2006.01)
*G11B 7/095*  (2006.01)

(52) U.S. Cl. .............................. 369/44.37; 369/44.29; 369/44.32; 369/44.36; 369/53.22

(58) Field of Classification Search ............ 369/44.37, 369/44.28, 44.32, 44.26, 44.41, 47.5, 53.14, 369/53.19, 53.23, 53.26, 44.29, 53.12, 53.34, 369/53.37, 44.35
See application file for complete search history.

(56) References Cited

U.S. PATENT DOCUMENTS

| | | | | |
|---|---|---|---|---|
| 5,483,512 | A * | 1/1996 | Yanagawa | 369/53.19 |
| 5,583,836 | A * | 12/1996 | Rokutan et al. | 369/44.28 |
| 5,625,618 | A * | 4/1997 | Oki | 369/275.1 |
| 6,002,656 | A * | 12/1999 | Miyagawa et al. | 369/44.28 |
| 6,246,660 | B1 * | 6/2001 | Yanagawa | 369/116 |
| 6,282,161 | B1 * | 8/2001 | Son et al. | 369/53.19 |
| 6,388,963 | B1 * | 5/2002 | Tanaka | 369/44.26 |
| 6,552,972 | B1 * | 4/2003 | Minemura et al. | 369/44.29 |
| 6,754,154 | B1 * | 6/2004 | Takeda et al. | 369/53.19 |
| 6,829,205 | B1 * | 12/2004 | Fukumoto | 369/53.14 |

* cited by examiner

*Primary Examiner*—William Korzuch
*Assistant Examiner*—Kim-Kwok Chu
(74) *Attorney, Agent, or Firm*—Hogan & Hartson LLP

(57) ABSTRACT

An optical system of an optical recording apparatus forms a main spot and sub-spots preceding and succeeding the main spot on a signal recording medium. The optical system is set such that the sub-spot is shifted from the main spot in the direction orthogonal to a signal track by a distance expressed by an expression (2k−1)P/4(k=natural number), in which P denotes a distance between adjacent signal tracks on the signal recording medium. Thus, the sub-spot succeeding the main spot can be used to effectively read the state of a signal recorded on the signal recording medium by the main spot.

22 Claims, 4 Drawing Sheets

OPTICAL RECORDING APPARATUS AND CONTROL METHOD THEREOF

BACKGROUND OF THE INVENTION

1. Field of the Invention

The present invention relates to an optical recording apparatus which uses an optical head for emitting a main beam and a sub-beam succeeding the main beam formed by diffraction of an optical beam from a light source, in order to read, from the sub-beam, a recording signal which has been recorded by the main beam on an information recording medium.

2. Description of Related Art

CD-R/RW drives for CD-R (Recordable) and CD-RW (ReWritable) systems of the CD family are well known optical disk recording apparatuses for recording a digital data signal onto a disk using an optical beam emitted from an optical head. Efforts are being made to increase the recording speed of such optical disk recording apparatuses.

Disks for use in recording by such optical disk recording apparatuses may have different recording sensitivities, depending on materials or manufacturer. Even disks manufactured by the same manufacture may differ in recording sensitivity due to manufacturing variation. Even in a single disk, different sections may have different sensitivities.

In optical disk recording apparatuses, it is therefore necessary to control an emission power of the optical head when recording so as to compensate for variations in recording sensitivity among disks, to thereby set the emission power of the optical head at an optimum level for disk recording.

For recording on CD-R disks, for which the recording speed has been increased to a high speed which is about 25 times faster than the normal speed, the recording conditions must be set strictly. This produces a necessity of so-called running OPC (Optimum Power Control) for controlling an emission power of the optical head by detecting the recording state of a recording signal recorded on the disk, in the disk recording operation.

Although detection of the recording state of the recording signal recorded on the disk is required so as to perform running OPC, it is difficult to detect the recording state of an actual recording signal during the recording operation. Accordingly, a method of detecting the recording state by detecting a reflection level of a recording pulse which is used for recording a recording signal has been implemented. With this method, however, the emission power of the optical head is not always set at a true optimum recording level because the recording state of the data recorded in the disk is not actually detected.

In order to overcome the above problem, a technology in which a sub-beam succeeding the main beam is further formed from an optical beam emitted to the disk from the optical head along with the main beam used for actual recording, and the recording signal recorded by the main beam is read using the sub-beam to thereby detect the recording state can be considered.

In optical disk recording apparatuses, a Differential Push-pull method is generally used for tracking control such that the 0th order beam of a diffraction beam from the optical head is used for the main beam and the ±1st order beams are used for the preceding and succeeding sub-beams for tracking control. However, this method has a problem that because in a state in which a tracking control signal is obtained optimally, namely in a state in which the main spot formed by the main beam is correctly located on the signal track, each sub-spot formed by each sub-beam is set at substantially the middle of adjacent signal tracks, a recording signal cannot be read in a good condition even when the succeeding sub-beam is used.

Further, although use of the succeeding sub-beam, of the ±2nd order beams of the diffraction light from the optical head, can be considered, S/N of the recording signal which is read is not preferable because the light amount of the ±2nd order beams of the diffraction light from the optical head is significantly less than that of the ±1st order beams.

SUMMARY OF THE INVENTION

In accordance with one aspect of the present invention, an optical system of an optical recording apparatus diffracts an optical beam emitted from a light source to form a main beam and a succeeding sub-beam following the main beam. A main spot is formed by the main beam on a signal recording medium and a succeeding sub-spot is formed by the succeeding sub-beam on the signal recording medium. The optical system is set such that a distance between the succeeding sub-spot and the main spot in the direction orthogonal to the extending direction of a signal track on the signal recording medium corresponds to an amount defined by an expression $(2k-1)P/4$ ($k$=natural number), where P denotes a distance between adjacent signal tracks on the signal recording medium.

In accordance with another aspect of the present invention, the optical system of the optical recording apparatus forms a preceding sub-beam along with the main beam and the succeeding sub-beam. Further, a photodetector of the optical recording apparatus receives reflected light of the main beam by a main light receiving region which is divided into two segments, receives reflected light of the preceding sub-beam by a preceding light receiving sub-region which is divided into two segments, and receives reflected light of the succeeding sub-beam by a succeeding light receiving sub-region which is divided into two segments. A first tracking error signal generating circuit generates a tracking error signal according to the Differential Push-pull method using the output of each segment region of the main light receiving region, the preceding light receiving sub-region, and the succeeding light receiving sub-region. A second tracking error signal generating circuit generates a tracking error signal in the Three Beam method based on the output of each segment region of the preceding light receiving sub-region and the succeeding light receiving sub-region. The switch control circuit causes the first and second tracking error signal generating circuits to selectively operate in accordance with the situation.

BRIEF DESCRIPTION OF THE DRAWINGS

These and other objects of the invention will be explained in the description below, in connection with the accompanying drawings, in which.

DETAILED DESCRIPTION OF THE PREFERRED EMBODIMENT

Figure 1:
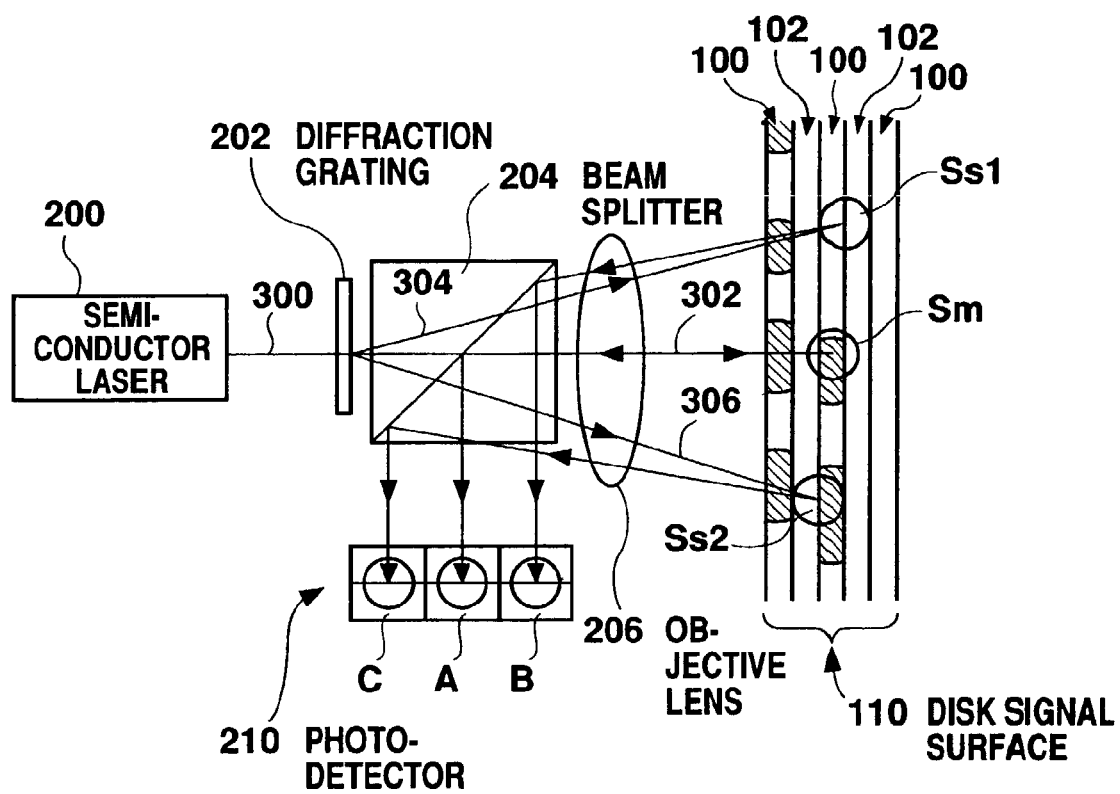
FIG. 1 is a diagram schematic showing a configuration of an optical system and a photodetector of an optical recording apparatus according to the present invention.
Figure 2:
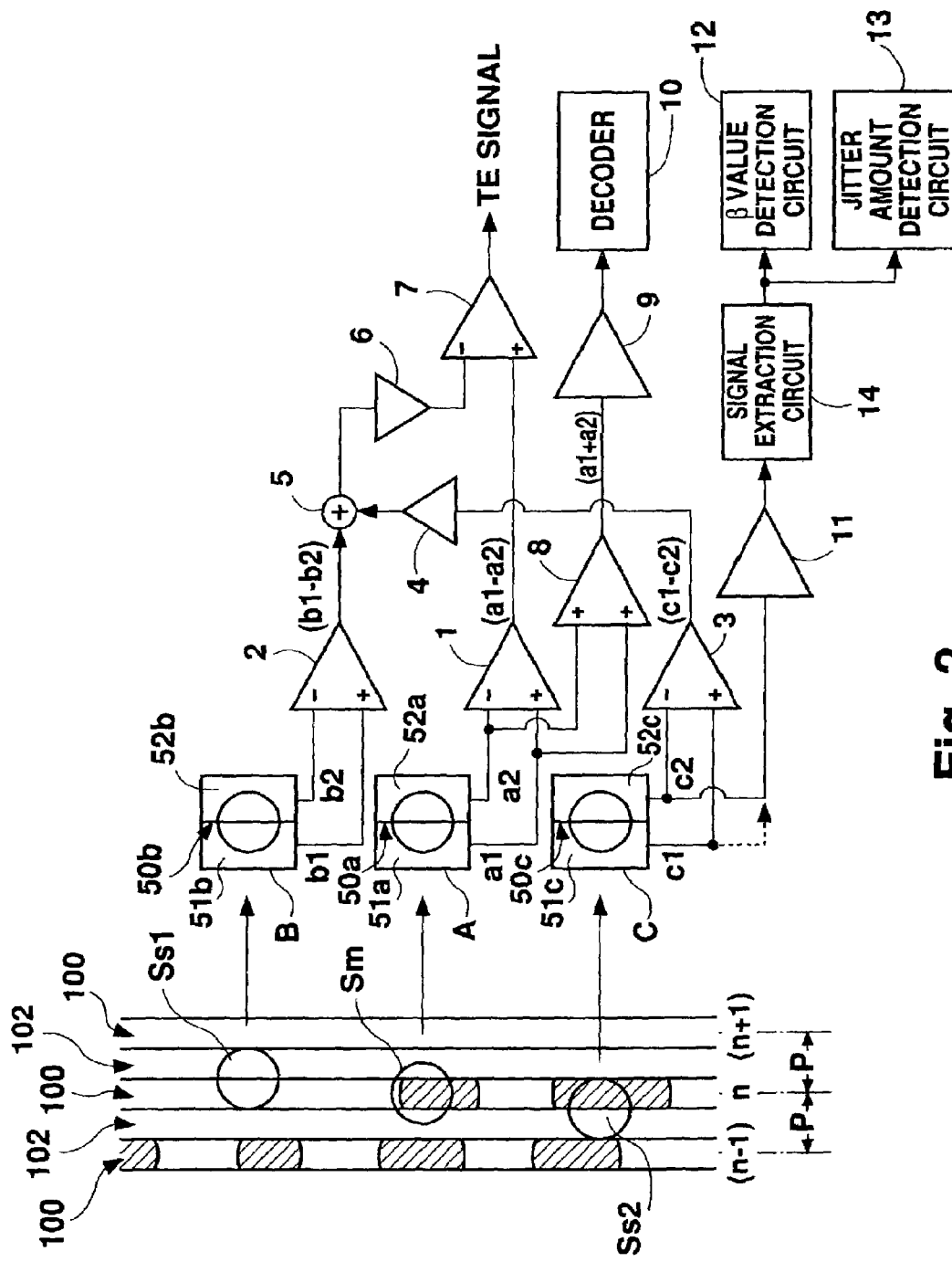
FIG. 2 is a diagram showing a configuration of a signal reading circuit of an optical recording apparatus according to the present invention.

FIG. 1 is a diagram for explaining an example configuration of an optical head of an optical recording apparatus according to the present invention. In FIG. 1, which is a schematic drawing, the size and positional relationship of the respective elements do not correctly represent the dimensions of an actual apparatus. Further, FIG. 2 shows a configuration of a signal reading circuit of the optical recording apparatus according to the present invention. The configuration shown in FIG. 2 is an example in which a Differential Push-pull method is used for tracking control.

Referring to FIG. 1, a laser beam (beam of focused laser light) 300 emitted from a semiconductor laser 200 of the optical head is diffracted by a diffraction grating 202, so that a main beam 302 which is a 0th order diffraction beam, a preceding sub-beam 304 which is a +1st order diffraction beam, and a succeeding sub-beam 306 which is a −1st order diffraction beam are formed. The main beam 302 is used for writing a recording signal onto a disk and for reading a signal recorded on the disk. The preceding sub-beam 304 and the succeeding sub-beam 306 are used for tracking control. Further, the succeeding beam 306 is also used for detecting the recording state of a signal recorded on the disk by the main beam 302.

In the present specification, when an expression such as "the sub-beam succeeding the main beam" or simply "the succeeding sub-beam" is used, it is assumed that the positional relationship of the sub-beam with regard to the main beam is set such that, when recording or reproducing data with regard to the disk, a site or a spot irradiated with the main beam is subsequently irradiated with the sub-beam; that is, the sub-beam follows the main beam. Further, when the expression "the sub-beam preceding the main beam" or simply "the preceding sub-beam" is used, it is assumed that the positional relationship of the sub-beam with regard to the main beam is set such that, when recording or reproducing data with regard to the disk, a site or a spot irradiated with the sub-beam is subsequently irradiated with the main beam. In this case, the main beam follows the sub-beam.

Each beam 302, 304, or 306 reaches a signal surface 110 of the disk through a beam splitter 204 and an objective lens 206.

In FIG. 1, a main spot Sm is an irradiation spot formed on the signal surface 110 by the main beam. Similarly, a preceding sub-spot Ss1 is an irradiation spot formed on the optical surface 110 by the preceding sub-beam and a succeeding sub-spot Ss2 is an irradiation spot formed on the optical surface 110 by the succeeding sub-beam.

Reflection of the respective spots Sm, Ss1, and Ss2 passing through the objective lens 206 is further reflected by the beam splitter 204 and guided to the photodetector 210. The photodetector 201 includes a main light receiving region A and light receiving sub-regions B and C. The main light receiving region A receives a reflection beam of the main beam 302. The light receiving sub-regions B and C receive reflection beams of the preceding and succeeding sub-beams 304 and 306, respectively.

This optical head is set in a manner that the position of each sub-spot Ss1, Ss2 is such that each sub-spot is shifted from the main spot Sm in a direction orthogonal to the signal track, in other words, along the radial direction of the disk, by a distance of $(2k-1)P/4$ ($k$=a natural number), wherein P denotes a distance between the center lines of adjacent signal tracks 100 on the signal surface of the disk. The sub-spots Ss1 and Ss2 are shifted from the main spot Sm in the opposite directions.

FIGS. 1 and 2 show an example in which $k=1$ in the above expression. Specifically, each sub-spot Ss1, Ss2 is located at a position which is shifted from the center of the interval 102 between adjacent signal tracks 100 toward the center signal track 100 on which the main spot Sm is positioned by a distance corresponding to ¼P. This shift, when expressed in a phase, can be expressed as $\pi/2$ (when $P=2\pi$). When the signal tracks 100 and the intervals 102 are substantially the same width, the center of each sub-spot Ss1, Ss2 is positioned at the edge of the signal track 100.

In the on-track state in which the main spot Sm is correctly located on the n-th signal track of the disk (namely, in the state in which the center of the spot Sm is located on the center axis of the n-th signal track), the sub-spot Ss1 is located such that a substantially half portion thereof on the inner peripheral side is projected on the n-th signal track and the other substantially half portion thereof on the outer peripheral side is projected onto the interval 102 between the n-th signal track and the (n+1)-th signal track adjacent, on the outer peripheral side, to the n-th track, and the sub-spot Ss2 is located such that a substantially half portion thereof on the outer peripheral side is projected onto the n-th signal track and a substantially half portion thereof on the inner peripheral side is projected onto the interval 102 between the n-th signal track and the (n−1)-th signal track adjacent, on the inner peripheral side, to the n-th track.

As shown in FIG. 2, each of the main light receiving region A and a pair of the light receiving sub-regions B and C is divided into at least two segments by a dividing line 50a, 50b, or 50C which extends in the direction corresponding to the extending direction of the signal track 100 of the disk. Each segment 51a, 52a, 51b, 52b, 51c, and 52c of the main light receiving region A and a pair of the light receiving sub-regions B and C produces an output corresponding to the amount of received light.

It should be noted that although at least the main light receiving region A is divided crosswise into four segments when the astigmatic method is used for focus control, as the subject matter of the present invention is not concerned with generation of a focus error signal, the main light receiving region A is divided in two segments in the example of FIG. 1 for simplification of description.

The segment regions 51a and 52a in the main light receiving region A of the photodetector generate outputs a1 and a2, respectively. The segment regions 51b and 52b of the light receiving sub-region B generate outputs b1 and b2, respectively, and the segment regions 51c and 52c of the light receiving sub-region C generate outputs c1 and c2, respectively.

A first differential amplifier 1 generates a differential output (a1−a2) between the outputs a1 and a2 output from the respective segment regions of the main light receiving region A. A second differential amplifier 2 generates a differential output (b1−b2) between the outputs b1 and b2 generated from the respective segment regions of the light receiving sub-region B. A third differential amplifier 3 generates a differential output (c1−c2) between the outputs c1 and c2 generated by the respective segment regions of the light receiving sub-region C.

The differential output (b1−b2) obtained by the second differential amplifier 2 and the differential output (c1−c2) obtained by the third differential amplifier 3 are added with each other in an adder 5, after the output from one differential amplifier, which is the differential output (c1−c2) from the third differential amplifier 3 in the example of FIG. 1, is subjected to level adjustment by an amplifier 4 so as to match the levels of the outputs from both differential amplifiers 2 and 3. The output from the adder 5 is a sum of the differential output (b1−b2) from the second differential amplifier 2 and the differential output from the third differential amplifier 3 which is subjected to level adjustment, g1(c1−c2). The addition result (b1−b2)+g1(c1−c2) is then subjected to level adjustment by gain g2 in an adjustment amplifier 6, so as to correspond with the level of the differential output (a1−a2) from the first differential amplifier 1 and then supplied to a fourth differential amplifier 7.

The differential amplifier 7 generates a differential signal {(a1−a2)−g2((b1−b2)+g1(c1−c2))} between the output g2((b1−b2)+g1(c1−c2)) from the level adjustment amplifier 6 and the differential output (a1−a2) from the first differential amplifier 1.

Here, in FIGS. 1 and 2, as described above, in the on-track state in which the main spot Sm is correctly located on the n-th signal track of the disk, the sub-spot Ss1 is located such that a half portion thereof on the inner peripheral side is projected on the n-th signal track and the other half portion thereof on the outer peripheral side is projected between the n-th signal track and the (n+1)-th signal track adjacent, on the outer peripheral side, to the n-th track, and the sub-spot Ss2 is located such that a half portion thereof on the outer peripheral side is projected onto the n-th signal track and a half portion thereof on the inner peripheral side is projected between the n-th signal track and the (n−1)-th signal track adjacent, on the inner peripheral side, to the n-th track.

Accordingly, reflection light of each sub-beam contains a signal component concerning the tracking control of the main beam. Further, reflection light of the sub-beam which is located after the main beam with respect to recording time sequence (namely, reflection light of the sub-spot Ss2) contains a recording signal component recorded on the disk by the main beam, namely a recording signal component on the n-th signal track.

Therefore, the output signal from the fourth differential amplifier 7 is a tracking error signal (TE signal) whose output level and polarity change in accordance with a shift amount and a shift direction between the main spot Sm with regard to the n-th signal track of the disk.

In this case, with the arrangement of the optical spots shown in FIGS. 1 and 2, although it is found that the level of the tracking error signal which is obtained is approximately half of the maximum level of the tracking signal obtained when each sub-spot Ss1, Ss2 is located on the center of the corresponding interval 102, the tracking control of the main beam can be performed without any adverse effects. Further, with the Differential Push-pull method, it is possible to remove or reduce an offset component of the output (a1−a2) from the first differential amplifier 1, caused by inclination of the disk or the like.

A circuit configuration for extracting, among signals read by the optical head, a HF signal (high frequency signal) corresponding to a recording signal recorded on the signal track 100 of the disk will be described.

The outputs a1 and a2 from the respective segment regions of the main light receiving region A are added by an addition amplifier 8, which generates an output (a1+a2).

The addition output (a1+a2) from the addition amplifier 8 corresponds to the reflection light of the main beam in the entire region of the main spot Sm, and therefore to a HF signal corresponding to a recording signal recorded on the signal track. This HF signal is then amplified in a HF amplifier 9 and then reproduced in the decoder 10 provided downstream.

On the other hand, the outer peripheral-side half portion of the sub-spot Ss2 corresponding to the sub-beam succeeding the main beam is emitted on the n-th signal track. The output c2 which is generated from the segment region 52c of the light receiving sub-region C corresponding to this half portion of the sub-spot Ss2 irradiating the n-th signal track is guided directly to a second HF amplifier 11.

Because the reflection light of the sub-beam following the main beam contains a recording signal component recorded by the main beam, being a recording signal component on the n-th signal track in the present example, the output c2 generated from the segment region 52c of the light receiving sub-region C is a HF signal corresponding to the recording signal on the n-th signal track. Consequently, the second HF amplifier 11 generates a HF signal corresponding to a recording signal on the signal track which is located after the site irradiated with the main beam in the recording or reading sequence with regard to the disk.

As described above, because when the main beam is in the on-track state with regard to the n-th signal track, the half portion of the sub-spot Ss2 on the outer peripheral side is located on the n-th track, it is possible to obtain a HF signal having the largest amplitude from an output c2 of the one segment region 52c of the light receiving sub-region C. In other words, the position of the sub-spot Ss2 is set while the amplitude of the output c2 is monitored so as to maximize the amplitude.

While the output c2 from one segment region 52c of the light receiving sub-region C is used for reading a HF signal in the recording operation in the above description, when a recording signal component of the n-th signal track is also contained in the output c1 of the other segment region 51c of the light receiving sub-region C due to crosstalk components or the like, both outputs c1 and c2 of the respective segment regions 51c and 52c of the light receiving sub-region C can be synthesized and supplied to the second HF amplifier 11, as indicated by a dashed line in FIG. 2, to make S/N of a HF signal preferable. When this is done, it is preferable that an addition of the outputs c1 and c2 is used to obtain the HF signal.

Further, although an example of k=1 in the above expression (2k−1)P/4(k=natural number) which defines a shift amount of each sub-spot Ss1, Ss2 with regard to the main spot Sm is described in the above description, the configuration shown in FIG. 1 can achieve similar effects when examples other than k=1 are used. More specifically, as k increases by one, the irradiation position of the sub-spot Ss2 is shifted by P/2 toward the inner peripheral side of the disk. In such a case, although the signal track irradiated by the sub-spot Ss2 varies or whether the signal track is covered by a right or left half of the sub-spot Ss2 is changed, it is always true that one half portion of the sub-spot Ss2 covers the signal track 100 and the other half thereof covers the interval 102 as long as the main spot Sm is in the on-track state. Consequently, because reflection light of each sub-beam contains a signal component concerning the tracking control of the main beam, a tracking error signal can be generated. Further, reflection light of the sub-beam succeeding the main beam contains a recording signal component recorded by the main beam, a HF signal can be read by the succeeding sub-beam.

Here, a HF signal output from the second HF amplifier 11 has been extracted in the recording operation in which a recording signal is being recorded on the disk by the main beam. This HF signal corresponds to a recording signal at a position which is slightly behind, in terms of recording time sequence, the position at which a recording signal is recorded by the main beam. Therefore, the recording state of the recording signal recorded by the main beam immediately prior to the HF signal is reflected in this HF signal.

Consequently, when the HF signal output from the second HF amplifier 11 is used to detect a β value (a recording depth) by a β value detection circuit 12 or detect a jitter amount of the recording signal by a jitter amount detection circuit 13, it is possible to detect the recording state of the recording signal actually recorded by the immediately preceding main beam.

In this case, as the emission power of the optical head changes in accordance with a recording signal to be recorded on the disk, the laser amount of the succeeding sub-beam also varies in accordance with the recording signal. A signal extraction circuit 14 is therefore provided so as to extract a HF signal read by the succeeding sub-beam at a correct level.

A sample-hold circuit can be used as an example of a signal extraction circuit 14. In such a case, the signal extraction circuit 14 is configured so as to sample a HF signal read using the succeeding sub-beam at a period when the emission power of the optical head in the disk recording is at predetermined one of the recording level and the recording pause level. With this configuration, a HF signal at a correct level can be obtained, although there is a lack of information regarding the waveform.

As another example of the signal extraction circuit 14, a level adjustment circuit may be used. In this case, the signal extraction circuit 14 amplifies an input HF signal with different gains at the recording level period and the recording pause level (generally, the reproducing level) period of the emission power of the optical head. This enables an output c2 (and/or c1) obtained from the light receiving sub-region C corresponding to the succeeding sub-beam to be adjusted at the same level for the recording level and the recording pause level (reproducing level), to thereby obtain a HF signal at a correct level.

The outputs a1, a2, b1, b2, c1, and c2 obtained from the respective light receiving regions A, B, and C of the photodetector are individually converted from a current signal to a voltage signal by separate current-to-voltage conversion amplifiers, for use in generation of various signals.

Conventionally, in such current-to-voltage conversion, a signal is amplified by a one-stage current-to-voltage conversion amplifier to a voltage level which is suitable for generating various signals. The gain of each current-to-voltage conversion amplifier is set to such a suitable voltage level.

Because conventionally each output from each segment region of each light receiving sub-region corresponding to each sub-beam has been used only for generating a tracking error signal, the emission power of the optical head has been set such that it becomes optimum at the reproducing level. Therefore, when the emission power of the optical head is at the recording level, particularly when the recording speed is set to the maximum speed so that the recording level of the emission power of the optical head becomes the maximum in accordance with the maximum speed, each current-to-voltage conversion amplifier is saturated. Here, it should be noted that generation of a tracking error signal can be performed preferably even in this saturation state.

According to the present invention, however, a HF signal is extracted from the sub-beam succeeding the main beam, of the sub-beams used for generating a tracking error signal. It is therefore not possible to extract a HF signal at a correct level, when each current-to-voltage conversion amplifier which receives each output c1, c2 from each segment region 51c, 52c, of the light receiving sub-region C corresponding to the succeeding sub-beam is saturated.

Figure 3:
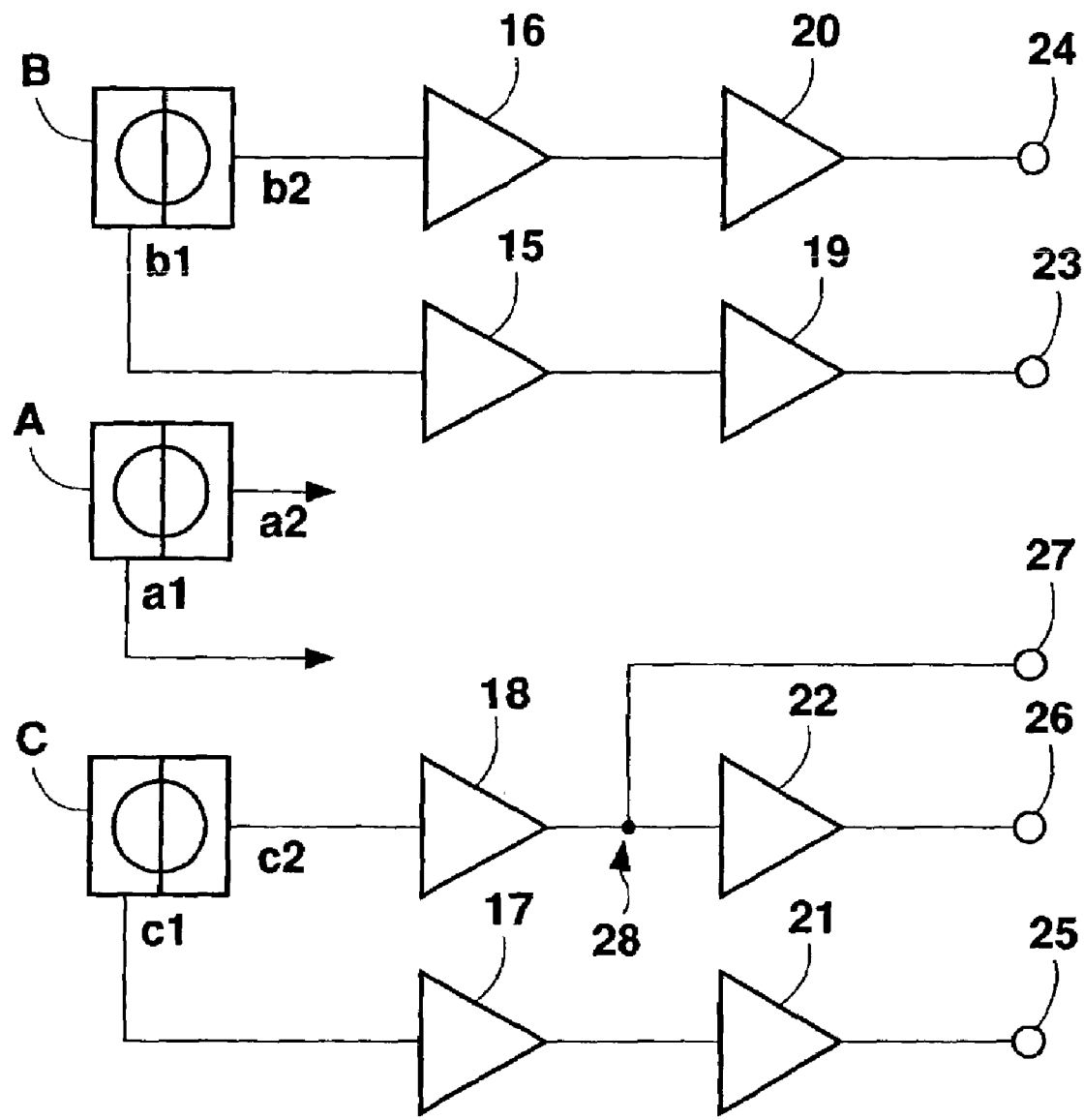
FIG. 3 is a diagram showing a configuration of a signal obtaining circuit for extracting outputs b1, b2, c1, and c2 from each segment region of light receiving sub-regions B and C in the signal reading circuit of FIG. 2.

Therefore, in this embodiment, a signal obtaining circuit for obtaining outputs b1 and b2, and c1 and c2 generated from the segment regions 51b, 52b, 51c, 52c, respectively, of the light receiving sub-regions B and C in FIG. 1 is configured as shown in FIG. 3.

Referring to FIG. 3, the outputs b1, b2, and c1, c2 generated from the respective segment regions of the light receiving sub-region B and C are individually supplied to current-to-voltage conversion amplifiers 15, 16, 17, and 18, respectively, wherein each output is converted from a current signal to a voltage signal.

Each output b1, b2, and c1, c2 converted into a voltage signal in the corresponding current-to-voltage conversion amplifier 15, 16, 17, or 18, is further amplified individually by a buffer amplifier 19, 20, 21, or 22, before being guided to a corresponding output terminal 23, 24, 25, or 26.

These outputs b1, b2, c1, and c2 guided to the respective output terminals 23, 24, 25, and 26 are supplied to the second or third amplifiers 2 and 3 in FIG. 2.

Here, the voltage level of each output b1, b2, c1, and c2 guided to the corresponding output terminal 23, 24, 25, or 26 is set by combining the gain of each current-to-voltage conversion amplifier 15, 16, 17, or 18 and the gain of the corresponding buffer amplifier 19, 20, 21, or 22. In the present embodiment, two-stage serial amplifiers, specifically, a current-to-voltage conversion amplifier and a buffer amplifier, are used to secure the output level which is similar to that of the conventional one-stage amplifier.

On the other hand, the gain of each current-to-voltage conversion amplifier 15, 16, 17, or 18 is always set at a level which prevents the output b1, b2, c1, or c2 from being saturated, even when the emission power of the optical head is at the recording level and the recording speed is set at the maximum level.

Further, the output c2 from one segment region 52c of the light receiving sub-region C corresponding to the succeeding sub-beam is diverged at a position 28 which is located downstream of the current-to-voltage conversion amplifier 18 and also upstream of the buffer amplifier 22 and guided to an output terminal 27. The output c2, when output form the output terminal 27, is supplied to the second HF amplifier 11 in FIG. 2.

Accordingly, it is possible to extract a HF signal at a correct level which is not saturated, by the output c2 from the output terminal 27, even when the emission power of the optical head is at the recording level.

Further, because the current-to-voltage conversion section in the signal path of the other outputs b1, b2, and c1 not used for extracting a HF signal is also composed of a current-to-voltage conversion amplifier and a buffer amplifier similar to the cased of the signal path for the output c2 used for extracting a HF signal, properties of the signals output from the respective output terminals 23, 24, 25, and 26 can be matched.

The signal obtaining circuit shown in FIG. 3 can be configured by a semiconductor integrated circuit for photodetector (so-called PDIC).

Figure 4:
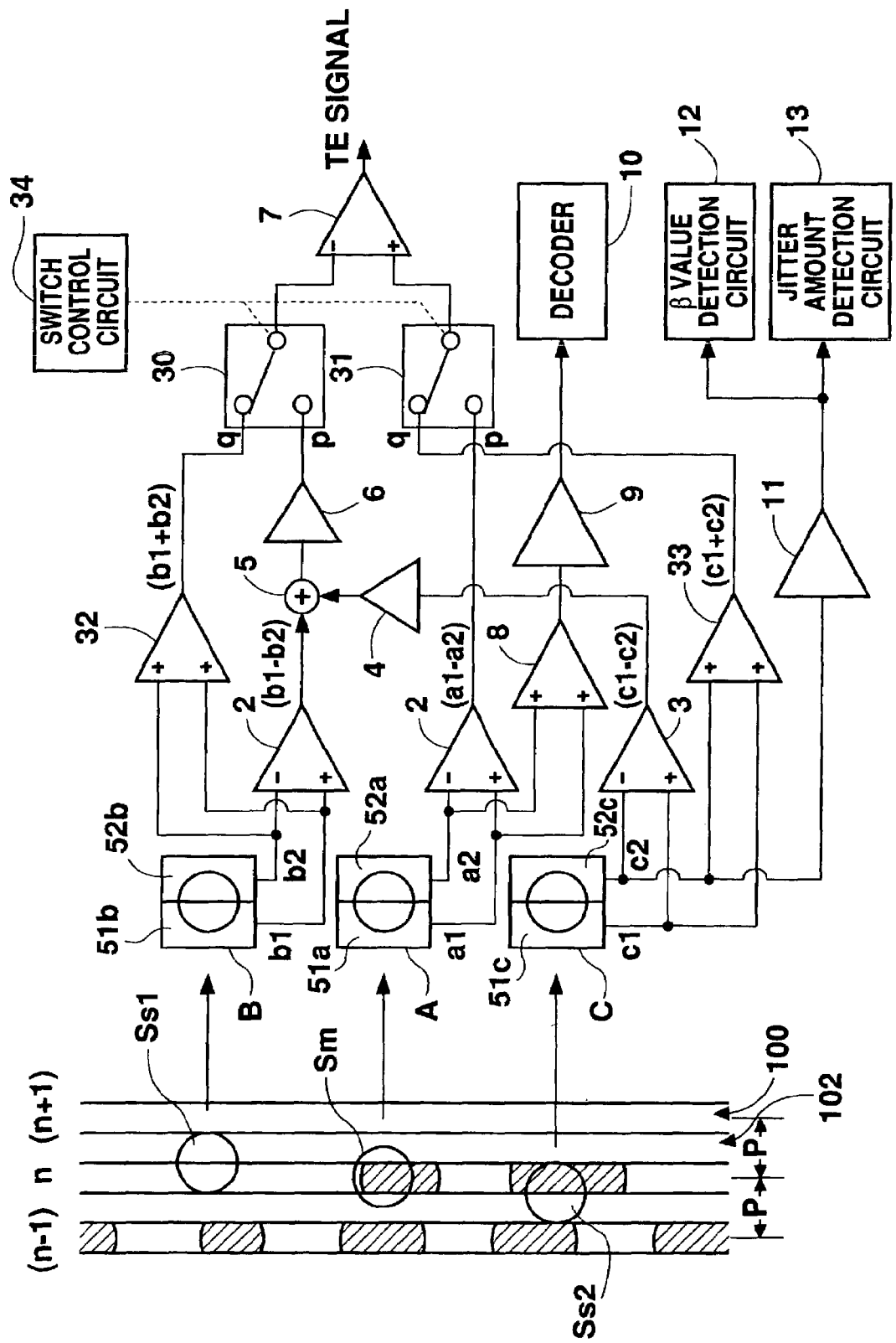
FIG. 4 is a view showing a configuration of a variation of a signal reading circuit according to the present invention.

Referring to FIG. 4, a variation of the apparatus according to the present invention will be described. In FIG. 4, elements which are identical with or similar to those in FIG. 2 are denoted with the same numerals and will not be described again. Further, the configuration of the optical head in this variation may be similar to that shown in FIG. 1. The positional relationship between the main spot Sm and the sub-spots Ss1, Ss2 are also similar to the case of the configuration shown in FIGS. 1 and 2. Namely, in this variation, the shift amount of each sub-spot Ss1, Ss2 with respect to the main spot is similarly defined by (2k−1)P/4.

In the circuit configuration of FIG. 4, addition amplifiers 32, 33, selection circuits 30, 31 and a switch control circuit 34 are further provided to the configuration of FIG. 2. The signal extraction circuit 14, which is not shown in FIG. 4, may be provided.

Referring to FIG. 4, the first addition amplifier 32 adds the outputs b1 and b2 generated from the respective segment regions 51$b$ and 52$b$ of the light receiving sub-region B, to generate an addition output (b1+b2). On the other hand, the second addition amplifier 33 adds the outputs c1 and c2 generated from the respective segment regions 51$c$ and 52$c$ of the light receiving sub-region C, to generate an addition output (c1+c2).

The selection circuit 30 has two input terminals p and q. The output g2(b1−b2)+g1(c1−c2) from the level adjustment amplifier 6 is input to the p input and the output (b1+b2) from the first addition amplifier 32 is input to the q input. The output of the selection circuit 30 is connected to the inverted input terminal of the fourth differential amplifier 7 used for generating a tracking error (TE) signal. Under the control of the switch control circuit 34, the selection circuit 30 selects one of the p and q inputs to supply the output to the inverted input terminal of the fourth differential amplifier 7.

The selection circuit 31 has two input terminals p and q. The output (a1−a2) from the first differential amplifier 1 is input to the p input and the output (c1+c2) from the second addition amplifier 33 is input to the q input. The output of the selection circuit 31 is connected to the non-inverted input terminal of the fourth differential amplifier 7. Under the control of the switch control circuit 34, the selection circuit 31 selects one of the p and q inputs to supply the output to the non-inverted input terminal of the fourth differential amplifier 7.

When the p inputs are selected in both the selection circuits 30 and 31, the fourth differential amplifier 7 generates a differential output {(a1−a2)−g2((b1−b2)+g1(c1−c2))} between the output g2((b1−b2)+g1(c1−c2)) from the level adjustment amplifier 6 and the output (a1−a2) from the first differential amplifier 1. This differential output is identical with the output of the differential amplifier 7 of FIG. 1, and can be used as a tracking error signal in the Differential Push-pull method.

When the q inputs are selected in both the selection circuits 30 and 31, on the other hand, the addition output (b1+b2) of the first addition amplifier 32 is input to the inverted input terminal of the fourth differential amplifier 7 and the addition output (c1+c2) of the second addition amplifier 33 is input to the non inverted input terminal of the fourth differential amplifier 7. Consequently, the fourth differential amplifier 7 generates a differential output (c1+c2) −(b1+b2) obtained by subtracting the addition output (b1+b2) of the first addition amplifier 32 from the addition output (c1+c2) of the second addition amplifier 33. This differential output (c1+c2)−(b1+b2) serves as a tracking error signal in the Three Beam method.

The switch control circuit 34 switches the selection state of each selection circuit 30, 31 based on the result of disk type determination.

Disks may be classified as either disks for use in recording (hereinafter referred to as "recordable disks") or disks for use in reproduction only (hereinafter referred to as "read only disks". In the case of compact disks, for example, a wobbled pre-groove is formed in a recordable disk (CD-R or CD-RW), and a wobble signal is read from the wobble of the pre-groove for use in a clock or the like when reproducing or recording. On the other hand, such a wobble is not formed in a read only disk. Therefore, if a wobble signal is reproduced in disk reproducing, the disk can be determined to be a recordable disk. If a wobble signal is not reproduced, on the other hand, the disk can be determined as a read only disk.

When a disk which is being reproduced or recorded is determined to be a recordable disk, the switch control circuit 34 switches the selection circuits 30 and 32 so as to select the p inputs, so that the fourth differential amplifier 7 generates a tracking error signal in the Differential Push-pull method.

When a disk which is being reproduced or recorded is determined as a read only disk, the switch control circuit 34 switches the selection circuits 30 and 32 so as to select the q inputs, so that the fourth differential amplifier 7 generates a tracking error signal in the Three Beam method.

Here, in the case of read only disks in which a recording mark is formed from pits and lands, when the optical spots are disposed as shown in FIG. 4, some disks may suffer from a problem that a tracking error signal cannot be detected appropriately by the Differential Push-pull method because a difference in height between a pit and a land varies among disks. According to the present invention, on the other hand, a tracking error signal is detected by the Three Beam method in the case of read only disks. Accordingly, it is possible to appropriately detect a tracking error signal even when the optical spots are arranged as shown in FIG. 4, so that tracking control can be correctly performed.

As described above, with the circuit configuration of FIG. 4, it is possible to generate a suitable tracking error signal by the Differential Push-pull method when a disk being reproduced or recorded is a recordable disk, and by the Three Beam method when a disk being reproduced or recorded is a read only disk. Further, the running Optimum Power Control in the recording operation can be performed similarly to the configuration of FIG. 2 by means of the β value detection circuit 12 and the jitter amount detection circuit 13.

As described above, according to the configurations shown in FIGS. 2 and 4, the succeeding sub-beam can be used to read a signal component of both a tracking control signal and a recording signal recorded by the main beam.

Further, with the configurations shown in FIGS. 2 and 4, when the Differential Push-pull method is employed, the light receiving sub-region corresponding to the ±1st order beam of a diffraction light is divided into two segments. In such a case, when the main spot corresponding to the main beam is on-track state, a half portion of the succeeding sub-spot corresponding to the succeeding sub-beam is located on the signal track, so that a recording signal with a preferable quality can be obtained from one segment region of the light receiving sub-region.

Further, by combining the outputs from the two segment regions of the light receiving sub-region corresponding to the succeeding sub-beam, it is possible to effectively utilize a recording signal component which leaks into the segment region of the light receiving sub-region other than the segment region of the light receiving sub-region from which a recording signal component is mainly extracted.

Moreover, because a recording signal which is read with the sub-beam succeeding the main beam is supplied to the current-to-voltage conversion amplifier and then to the jitter amount detection circuit or the like from the upstream of the buffer amplifier, it is possible to extract an unsaturated recording signal at a correct level even when the emission power of the optical head is at a recording level.

Still further, with the configuration of FIG. 4, the Differential Push-pull method is used for tracking control when a recordable disk is used, and the Three Beam method is used for tracking control when a read only disk is used. Therefore, in the case of read only disks for which tracking control using the Differential Push-pull method is no reliable due to the arrangement of the optical spots, the Three Beam method is employed so that tracking control can be reliably performed even with the read only disks.

While the preferred embodiments of the present invention have been described using specific terms, such description is for illustrative purposes only, and it is to be understood that changes and variations may be made without departing from the spirit or scope of the appended claims.

What is claimed is:

1. An optical recording apparatus comprising:

an optical system for diffracting an optical beam emitted from a light source to form a main beam and a succeeding sub-beam following the main beam and for irradiating a signal recording medium with the main beam and the succeeding sub-beam, wherein a main spot is formed on the signal recording medium by irradiation of the main beam and a succeeding sub-spot is formed on the signal recording medium by irradiation of the succeeding sub-beam; and a photodetector including a main light receiving region for receiving reflected light of the main spot on the signal recording medium and a succeeding light receiving sub-region for receiving reflected light of the succeeding sub-spot on the signal recording medium, wherein the optical system is set such that a distance between the succeeding sub-spot and the main spot in the direction orthogonal to an extending direction of a signal track on the signal recording medium corresponds to an amount defined by an expression $(2k-1)P/4$ ($k$=a natural number), in which P denotes a distance between adjacent signal tracks on the signal recording medium, wherein the optical system diffracts the optical beam to further form a preceding sub-beam preceding the main beam, which forms a preceding sub-spot on the signal recording medium, wherein the photodetector further includes a preceding light receiving sub-region for receiving reflected light of the preceding sub-spot, wherein each of the main light receiving region, the succeeding light receiving sub-region, and the preceding light receiving sub-region is divided into two segment regions by a dividing line which extends in a direction corresponding to the extending direction of the signal track on the signal recording medium, the optical recording apparatus further comprises a first tracking error signal generating circuit for generating a tracking error signal in a Differential Push-pull method based on an output from each segment region of the main light receiving region, the succeeding light receiving sub-region, and the preceding light receiving sub-region, further comprising an evaluation circuit for evaluating the recording state of a recording signal recorded with the main beam on the signal track on the signal recording medium, wherein the evaluation circuit evaluates the recording state based on an output from a predetermined one of the two segment regions of the succeeding light receiving sub-region, further comprising a current-to-voltage conversion amplifier provided for each segment region of the succeeding light receiving sub-region for converting into a voltage signal from a current signal output from a corresponding segment region, and further comprising a buffer amplifier for gain adjustment provided downstream of each current-to-voltage conversion amplifier, for amplifying an output from a corresponding current-to-voltage conversion amplifier, and wherein an output from each buffer amplifier is supplied to the first tracking error generating circuit, and an output from the current-to-voltage conversion amplifier corresponding to the predetermined one of the two segment regions of the succeeding light receiving sub-region, prior to amplification by the buffer amplifier, is supplied to the evaluation circuit.

2. An optical recording apparatus according to claim 1, wherein the evaluation circuit evaluates the recording state of a recording signal recorded by irradiation of the main beam on the signal track of the signal recording medium, and wherein the evaluation circuit evaluates the recording state based on a signal output from the succeeding light receiving sub-region of the photodetector.

3. An optical recording apparatus according to claim 2, wherein the evaluation circuit includes a jitter amount detection circuit for obtaining, as the recording state, a jitter amount of a recording signal recorded on the signal recording medium based on a signal output from the succeeding light receiving sub-region of the photodetector.

4. An optical recording apparatus according to claim 1, wherein the gain of the current-to-voltage conversion amplifiers is set at a value at which each current-to-voltage conversion amplifier is not saturated by the output from the predetermined one of the segment regions of the succeeding light receiving sub-region even when power of the optical beam from the light source is set at the maximum value in the optical recording apparatus.

5. An optical recording apparatus according to claim 4, wherein the current-to-voltage conversion amplifier provided for each segment region of the preceding light receiving sub-region, converts a current signal output from corresponding one of the segment regions into a voltage signal, the current-to-voltage conversion amplifier having substantially the same characteristics as the current-to-voltage conversion amplifier provided corresponding to each segment region of the succeeding light receiving sub-region; and the buffer amplifier for gain adjustment provided downstream of each current-to-voltage conversion amplifier for amplifying an output from a corresponding current-to-voltage conversion amplifier, has substantially the same characteristics as the buffer amplifier provided corresponding to each segment region of the succeeding light receiving sub-region, wherein an output from each buffer amplifier is supplied to the first tracking error signal generation circuit.

6. An optical recording apparatus according to claim 1, wherein the evaluation circuit evaluates the recording state of a recording signal recorded by the main beam on the signal track of the signal recording medium, and wherein the evaluation circuit evaluates the recording state based on a composite signal obtained by combining outputs from the two segment regions of the succeeding light receiving sub-region.

7. An optical recording apparatus according to claim 1, wherein the main beam is a 0th order diffraction beam formed by a diffraction grating, and one of the preceding and succeeding sub-beams is a +1st order diffraction beam formed by the diffraction grating and the other is a −1st order diffraction beam formed by the diffraction grating.

8. An optical recording apparatus according to claim 1, further comprising:
a second tracking error signal generating circuit for generating a tracking error signal using a Three Beam method based on an output from each segment region of the succeeding light receiving sub-region and the preceding light receiving sub-region; and
a switch control circuit for causing one of the first tracking error signal generating circuit and the second tracking error signal generating circuit to selectively operate.

9. An optical recording apparatus according to claim 8, wherein the evaluation circuit evaluates the recording state of a recording signal recorded by the main beam on the signal track of the signal recording medium, and
wherein the evaluation circuit evaluates the recording state based on a signal output from the succeeding light receiving sub-region of the photodetector.

10. An optical recording apparatus according to claim 8, wherein
the switch control circuit switches between the first tracking error signal generation circuit and the second tracking error signal generation circuit to operate, depending on the type of the signal recording medium.

11. An optical recording apparatus according to claim 8, wherein
the determination as to which one of the first tracking error signal generation circuit and the second tracking error signal generation circuit is operated is made based on a determination result whether the signal recording medium is a recordable medium or a medium for reproduction only.

12. An optical recording apparatus according to claim 11, wherein
the signal recording medium is determined to be a recordable medium when a predetermined wobble signal is obtained from a reproduction signal of the signal recording medium, and the signal recording medium is determined to be a medium for reproduction only when the predetermined wobble signal is not obtained.

13. A control method of an optical recording apparatus, wherein
the optical recording apparatus comprises:
an optical system for diffracting an optical beam emitted from a light source to form a main beam and a succeeding sub-beam following the main beam and for irradiating a signal recording medium with the main beam and the succeeding sub-beam, wherein a main spot is formed on the signal recording medium by irradiation with the main beam and a succeeding sub-spot is formed on the signal recording medium by irradiation with the succeeding sub-beam; and
a photodetector including a main light receiving region for receiving reflected light of the main spot on the signal recording medium and a succeeding light receiving sub-region for receiving reflected light of the succeeding sub-spot on the signal recording medium, wherein the optical system is set such that a distance between the succeeding sub-spot and the main spot in a direction orthogonal to an extending direction of a signal track on the signal recording medium corresponds to an amount defined by an expression $(2k-1)P/4$ ($k$=a natural number), in which P denotes a distance between adjacent signal tracks on the signal recording medium, and the control method comprises the steps of:
recording a signal by the main beam on the signal track of the signal recording medium;
detecting the signal recorded by the main beam on the signal track using the succeeding light receiving sub-region; and
evaluating the state of the signal recorded by the main beam on the signal track based on an output from the succeeding light receiving sub-region to control the light source in accordance with a result of the evaluation, and wherein in the optical recording apparatus, the optical system diffracts the optical beam to further form a preceding sub-beam preceding the main beam, which forms a preceding sub-spot on the signal recording medium,
the photodetector further includes a preceding light receiving sub-region for receiving reflected light of the preceding sub-spot, each of the main light receiving region, the succeeding light receiving sub-region, and the preceding light receiving sub-region is divided into two segment regions by a dividing line which extends in a direction corresponding to the extending direction of the signal track on the signal recording medium, said optical recording apparatus further comprising:
a first tracking error signal generating circuit for generating a tracking error signal in a Differential Push-pull method based on an output from each segment region of the main light receiving region, the succeeding light receiving sub-region, and the preceding light receiving sub-region; and
a second tracking error signal generating circuit for generating a tracking error signal using a Three Beam method based on an output from each segment region of the preceding light receiving region, and the succeeding light receiving sub-region,
the control method further comprising a switching step of causing one of the first tracking error signal generating circuit and the second tracking error signal generating circuit to selectively operate.

14. A control method according to claim 13, wherein
in the switching step, determination of which one of the first tracking error signal generation circuit and the second tracking error signal generation circuit is operated is based on a detected characteristic of the signal recording medium.

15. An optical recording apparatus comprising:
an optical system for diffracting an optical beam emitted from a light source to form a main beam and a succeeding sub-beam following the main beam and for irradiating a signal recording medium with the main beam and the succeeding sub-beam, wherein a main spot is formed on the signal recording medium by irradiation of the main beam and a succeeding sub-spot is formed on the signal recording medium by irradiation of the succeeding sub-beam: and
a photodetector including a main light receiving region for receiving reflected light of the main spot on the signal recording medium and a succeeding light receiving sub-region for receiving reflected light of the succeeding sub-spot on the signal recording medium, wherein the optical system is set such that a distance between the succeeding sub-spot and the main spot in the direction orthogonal to an extending direction of a signal track on the signal recording medium corresponds to an amount defined by an expression (2k−1) P/4(k=a natural number), in which P denotes a distance between adjacent signal tracks on the signal recording medium, further comprising an evaluation circuit for evaluating the recording state of a recording signal recorded by irradiation of the main beam on the signal track of the signal recording medium, wherein the evaluation circuit evaluates the recording state based on a signal output from the succeeding light receiving sub-region of the photodetector, wherein the evaluation circuit includes a jitter amount detection circuit for obtaining, as the recording state, a jitter amount of a recording signal recorded on the signal recording medium based on a signal output from the succeeding light receiving sub-region of the photodetector, wherein the optical system diffracts the optical beam to further form a preceding sub-beam preceding the main beam, which forms a preceding sub-spot on the signal recording medium, the photodetector further includes a preceding light receiving sub-region for receiving reflected light of the preceding sub-spot, each of the main light receiving region, the succeeding light receiving sub-region, and the preceding light receiving sub-region is divided into two segment regions by a dividing line which extends in a direction corresponding to the extending direction of the signal track on the signal recording medium, the optical recording apparatus further comprises a first tracking error signal generating circuit for generating a tracking error signal in a Differential Push-pull method based on an output from each segment region of the main light receiving region, the succeeding light receiving sub-region, and the preceding light receiving sub-region, further comprising an evaluation circuit for evaluating the recording state of a recording signal recorded with the main beam on the signal track on the signal recording medium, wherein the evaluation circuit evaluates the recording state based on an output from a predetermined one of the two segment regions of the succeeding light receiving sub-region, a current-to-voltage conversion amplifier provided for each segment region of the succeeding light receiving sub-region for converting into a voltage signal from a current signal output from a corresponding segment region; and a buffer amplifier for gain adjustment provided downstream of each current-to-voltage conversion amplifier, for amplifying an output from a corresponding current-to-voltage conversion amplifier, wherein an output from each buffer amplifier is supplied to the first tracking error generating circuit, and an output from the current-to-voltage conversion amplifier corresponding to the predetermined one of the two segment regions of the succeeding light receiving sub-region, prior to amplification by the buffer amplifier, is supplied to the evaluation circuit.

16. An optical recording apparatus according to claim 15, wherein the gain of the current-to-voltage conversion amplifiers is set at a value at which each current-to-voltage conversion amplifier is not saturated by the output from the predetermined one of the segment regions of the succeeding light receiving sub-region even when power of the optical beam from the light source is set at the maximum value in the optical recording apparatus.

17. An optical recording apparatus according to claim 16, further comprising:

the current-to-voltage conversion amplifier provided for each segment region of the preceding light receiving sub-region, for converting a current signal output from corresponding one of the segment regions into a voltage signal, the current-to-voltage conversion amplifier having substantially the same characteristics as the current-to-voltage conversion amplifier provided corresponding to each segment region of the succeeding light receiving sub-region; and the buffer amplifier for gain adjustment provided downstream of each current-to-voltage conversion amplifier for amplifying an output from a corresponding current-to-voltage conversion amplifier, the buffer amplifier having substantially the same characteristics as the buffer amplifier provided corresponding to each segment region of the succeeding light receiving sub-region, wherein an output from each buffer amplifier is supplied to the first tracking error signal generation circuit.

18. An optical recording apparatus comprising:

an optical system for diffracting an optical beam emitted from a light source to form a main beam and a succeeding sub-beam following the main beam and for irradiating a signal recording medium with the main beam and the succeeding sub-beam, wherein a main spot is formed on the signal recording medium by irradiation of the main beam and a succeeding sub-spot is formed on the signal recording medium by irradiation of the succeeding sub-beam; and a photodetector including a main light receiving region for receiving reflected light of the main spot on the signal recording medium and a succeeding light receiving sub-region for receiving reflected light of the succeeding sub-spot on the signal recording medium, wherein the optical system is set such that a distance between the succeeding sub-spot and the main spot in the direction orthogonal to an extending direction of a signal track on the signal recording medium corresponds to an amount defined by an expression (2k−1) P/4(k=a natural number), in which P denotes a distance between adjacent signal tracks on the signal recording medium, further comprising an evaluation circuit for evaluating the recording state of a recording signal recorded by irradiation of the main beam on the signal track of the signal recording medium, wherein the evaluation circuit evaluates the recording state based on a signal output from the succeeding light receiving sub-region of the photodetector, wherein the evaluation circuit includes a jitter amount detection circuit for obtaining, as the recording state, a jitter amount of a recording signal recorded on the signal recording medium based on a signal output from the succeeding light receiving sub-region of the photodetector, wherein the optical system diffracts the optical beam to further form a preceding sub-beam preceding the main beam, which forms a preceding sub-spot on the signal recording medium, the photodetector further includes a preceding light receiving sub-region for receiving reflected light of the preceding sub-spot, each of the main light receiving region, the succeeding light receiving sub-region, and the preceding light receiving sub-region is divided into two segment regions by a dividing line which extends in a direction corresponding to the extending direction of the signal track on the signal recording medium, the optical recording apparatus further comprises a first tracking error signal generating circuit for generating a tracking error signal in a Differential Push-pull method based on an output from each segment region of the main light receiving region, the succeeding light receiving sub-region, and the preceding light receiving sub-region, a second tracking error signal generating circuit for generating a tracking error signal using a Three Beam method based on an output from each segment region of the succeeding light receiving sub-region and the preceding light receiving sub-region; and a switch control circuit for causing one of the first tracking error signal generating circuit and the second tracking error signal generating circuit to selectively operate.

19. An optical recording apparatus according to claim 18, wherein the evaluation circuit evaluates the recording state of a recording signal recorded by the main beam on the signal track of the signal recording medium, wherein the evaluation circuit evaluates the recording state based on a signal output from the succeeding light receiving sub-region of the photodetector.

20. An optical recording apparatus according to claim 18, wherein the switch control circuit switches between the first tracking error signal generation circuit and the second tracking error signal generation circuit to operate, depending on the type of the signal recording medium.

21. An optical recording apparatus according to claim 18, wherein the determination as to which one of the first tracking error signal generation circuit and the second tracking error signal generation circuit is operated is made based on a determination result whether the signal recording medium is a recordable medium or a medium for reproduction only.

22. An optical recording apparatus according to claim 21, wherein the signal recording medium is determined to be a recordable medium when a predetermined wobble signal is obtained from a reproduction signal of the signal recording medium, and the signal recording medium is determined to be a medium for reproduction only when the predetermined wobble signal is not obtained.

* * * * *